United States Patent
Glückstad

[11] Patent Number: 6,011,874
[45] Date of Patent: Jan. 4, 2000

[54] PHASE CONTRAST IMAGING

[75] Inventor: Jesper Glückstad, Osaka, Japan

[73] Assignee: Forskningscenter Risø (Danish national laboratory), Roskilde, Denmark

[21] Appl. No.: 08/945,352

[22] PCT Filed: Apr. 26, 1996

[86] PCT No.: PCT/DK96/00190

§ 371 Date: Dec. 1, 1997

§ 102(e) Date: Dec. 1, 1997

[87] PCT Pub. No.: WO96/34307

PCT Pub. Date: Oct. 31, 1996

[30] Foreign Application Priority Data

Apr. 28, 1995 [DK] Denmark ................................ 0506/95

[51] Int. Cl.[7] .............................................. G06K 9/36
[52] U.S. Cl. .................................... 382/276; 359/559
[58] Field of Search .................................. 382/276, 280, 382/294, 212, 100; 356/4, 45; 250/550, 491.1; 359/559

[56] References Cited

U.S. PATENT DOCUMENTS

| | | | |
|---|---|---|---|
| 4,171,159 | 10/1979 | White ..................................... | 356/349 |
| 4,806,776 | 2/1989 | Kley ...................................... | 250/560 |
| 5,363,186 | 11/1994 | Cohn et al. ............................. | 356/4 |

FOREIGN PATENT DOCUMENTS 657760  6/1995  European Pat. Off. .
2199716  7/1988  United Kingdom .

OTHER PUBLICATIONS

Lohmann A.W. et al "Array Illuminator Based on Phase Contrast", Applied Optics, New York, NY. vol. 27, No. 14, Jul. 15, 1988 pp. 2915–2921.

*Primary Examiner*—Yon J. Couso

[57] ABSTRACT

An improved method based on a simple imaging operation with a simple one-to-one mapping between resolution elements of a spatial phase modulator and resolution elements of the generated intensity pattern is provided. According to the invention a method is provided for synthesizing an intensity pattern with low loss of electromagnetic energy, spatial modulation of electromagnetic radiation with a spatial phase mask for modulation of the phase of the incident electromagnetic radiation by phasor values of individual resolution elements of the spatial phase mask, each phasor value being determined in such a way that the values of the Fourier transformed phasors attain predetermined values for predetermined spatial frequencies, and the phasor value of the specific resolution element of the spatial phasor mask corresponds to a distinct intensity level of the image of the resolution element in the intensity pattern, and a spatial phase filter for phase shifting of a part of the electromagnetic radiation, in combination with an imaging system for generation of the intensity pattern by interference in the image plane of the imaging system between the part of the electromagnetic radiation that has been phase shifted by the phase filter and the remaining part of the electromagnetic radiation.

65 Claims, 6 Drawing Sheets

PHASE CONTRAST IMAGING

FIELD OF THE INVENTION

The invention relates to a method and a system for synthesizing a prescribed intensity pattern based on phase contrast imaging.

BACKGROUND OF THE INVENTION

It is well known to form an image on an illuminated surface of a body by absorption or blocking of energy of an illuminating beam. For example in an overhead projector, an over-head transparent absorbs or blocks part of the light beam of the projector whereby a large image of an overhead is formed on a screen. However, this results in a loss of light intensity as part of the emitted light from an image forming system is reflected or absorbed.

To avoid loss of energy causing, e.g. loss of light intensity of the synthesized intensity pattern, power dissipation generating heat in components of the system, etc., methods and systems have been developed wherein the phase of a light beam is modulated instead of the amplitude or intensity of the light beam, as modulation of the phase of the light beam do not lead to loss of energy. The phase modulation is followed by a conversion of the phase modulation into an amplitude or intensity modulation.

A diffractive optical element, such as a holographic optical element, may be used to generate a phase modulation. Then, the resulting intensity modulation at each point of a picture formed by conversion of the phase modulation into intensity modulation will depend upon the phase modulation values at each point of the diffractive optical element as the light intensity at each point of the picture is formed by a coherent superposition of light received from the entire surface of the diffractive optical element. Diffractive optical elements are rather complex to design for synthesis of a prescribed intensity pattern.

Imaging methods and systems may also be used in connection with phase modulation. These methods and systems are characterized by the fact that the intensity of a point of a picture formed by conversion of phase modulation into intensity modulation will depend upon the phase modulation value of one point of the phase modulator only as this point is imaged onto the picture point in question by the imaging system. This one-to-one relationship makes the design of phase modulators in these systems simple. Methods and systems of this kind are named phase contrast imaging methods and systems.

Phase contrast imaging methods were originally developed within the field of microscopy. Many objects of interest in microscopy are largely transparent, thus absorbing little or no light. When light passes through such an object, the predominant effect is the generation of a spatially varying phase shift which can not be seen by a human as the eye of a human responds to light intensity and colour and does not respond to the phase of light.

In 1935, Fritz Zernik proposed a phase contrast technique which rests on spatial-filtering principles and has the advantage that the observed intensity is linearly related to the phase shift introduced by the object.

Suppose that a transparent object with amplitude transmittance $$t(x,y)=exp[j\phi(x,y)] \quad (1)$$

is coherently illuminated in an image-forming system. For simplicity, a magnification of unity is assumed and the finite extent of the exit and entrance pupils of the system is neglected. Further, a necessary condition to achieve linearity between phase shift and intensity is that the phase shift $\phi$ be less than 1 radian, in which case the amplitude transmittance can be approximated by $$t(x,y)=1+j\phi(x,y) \quad (2)$$

The terms of order $\phi^2$ and higher are neglected in this approximation. It is seen that the first term of (2) leads to a strong wave component that passes through the sample without change, while the second term generates weaker diffracted light that is deflected away from the axis of the system.

The image produced by a conventional microscope can be written $$I \approx |1+j\phi|^2 \approx 1 \quad (3)$$

where the term $\phi^2$ has been approximated by zero. It is seen that the diffracted light is not observable because it is in phase quadrature with the strong background. As Zernik recognized that the background is brought to a focus on-axis in the focal plane while the diffracted light—containing higher spatial frequencies—is spread away from the focal point, he proposed that a phase-changing plate be inserted in the focal plane to modify the phase relation between focused and diffracted light.

The phase-changing plate can consist of a glass substrate on which a small transparent dielectric dot has been coated. The dot is placed at the center of the focal plane and has a thickness and index of refraction such that it retards the phase of the focused light by either $\pi/2$ radians or $3\pi/2$ radians relative to the phase retardation of the diffracted light. In the former case the intensity in the image plane becomes $$I=|exp[j(\pi/2)+j\phi]|^2=|j(1+\phi)|^2 \approx 1+2\phi \quad (4)$$

while in the latter case $$I=|exp[j(3\pi/2)+j\phi]|^2=|j(-1+\phi)|^2 \approx 1-2\phi \quad (5)$$

Thus, the image intensity has become linearly related to the phase shift $\phi$. When the phase of the background is retarded by $\pi/2$, the result is known as positive phase contrast, while a $3\pi/2$ retardation is said to yield negative phase contrast.

It is seen that the method described above leads to a phase contrast imaging method that provides a small phase signal that is superimposed on a large DC-component. This leads to an important disadvantage of the method because, typically, it will be necessary to attenuate the DC-component to enhance the information contained in the phase modulated signal. However, the attenuation of the DC-component leads to loss of energy. This kind of filtering is usually denoted Dark Field Filtering.

It is another disadvantage of the phase contrast imaging method described above that it is based on the assumption that the phase shift $\phi$ is less than 1 radian which is very often not fulfilled in practical real-life applications. However, the theory is still applied to such applications, disregarding the fact that the basic assumption is not fulfilled, and this leads to non-optimized technical solutions.

In EP 0 657 760 a phase contrast imaging system is disclosed in which an image simulation and projection system is based on the Texas Instrument flexure beam digital mirror device (DMD). The flexure beam DMD is used for analog phase modulation of reflected light and the phase modulation is converted to amplitude modulation utilizing a phase contrast imaging method. The flexure beam DMD provides a flicker-free modulated wave and accordingly, optical image sensor synchronization is not needed. The system disclosed operates according to the Zernike method and, thus, includes the corresponding disadvantages described above.

Another example of a phase contrast imaging system is disclosed in GB 2 199 716, wherein an optical guide-beam projector for a missile guidance system is disclosed that provides a spatially intensity modulated guide-beam. A spatial phase modulator is used to generate the guide-beam. The phase encoding of the spatial phase modulator constitutes a periodic square-wave modulation (50% duty cycle) of two phase values 0 and π/2. The phase modulation is converted into an amplitude modulation by Fourier transforming lenses and a phase plate providing a phase shift of the background signal by π/2. A method for synthesizing the specific intensity pattern of the optical guide-beam based on phase contrast imaging is not disclosed in this document.

A similar example of a phase contrast imaging system is disclosed in "Array illuminator based on phase contrast", Applied Optics Vol. 27, No. 14, pp. 2915–2921 (1988). A method is disclosed of converting a wide beam of uniform intensity into an array of bright spots without losses. The input spatial phase mask constitutes a periodic array of phase dots with the phase value π, the remaining area of the phase mask having the phase value 0. The phase modulation is converted into an amplitude modulation by Fourier transforming lenses and a phase plate providing a phase shift of the background signal by π. The method is limited to the implementation of periodic array configurations with the binary phase values 0 and π.

It is well-known to use so-called "radiation focusators", i.e. computer generated holographic optical elements, for spatial phase modulation of a light beam, e.g as disclosed in Special Issue on Computer Optics in the USSR, Optics and Lasers in Engineering, Vol. 15, no. 5 1991. However, such elements are complicated to synthesize. Typically, they are synthesized in such a way that the desired image is formed in the Fresnel region or the Frauenhofer region. Thus, the intensity of a resolution element in the generated image is a function of several, typically all, phase values of the resolution elements of the holographic optical element. Obviously, this complicates the design of a general purpose holographic optical element and advanced, very time consuming algorithms have to be applied. Further, the complicated design of the holographic optical elements renders it almost impossible to implement dynamically changeable spatial phase modulators with such elements.

It is a further disadvantage of holographic optical elements that a carrier frequency is needed to separate diffracted light from non-diffracted light resulting in an off-axis system geometry and a need for a diffractive medium that can support these high frequency terms.

SUMMARY OF THE INVENTION

It is an object of the present invention to provide an apparatus of the above kind which apparatus is robust, compact, simple to design and relatively cheap to manufacture.

It is another object of the present invention to provide an improved method and apparatus for phase contrast imaging that take all terms of the Taylor's series:

$$t(x, y) = e^{i\phi(x,y)} = 1 + i\phi(x, y) - \frac{\phi(x, y)^2}{2!} - i\frac{\phi(x, y)^3}{3!} + \frac{\phi(x, y)^4}{4!} + \ldots \quad (6)$$

into account and, thus, is not based on the assumption that the phase shift φ is less than 1 radian. It is important to note that each term of the Taylor's series contribute to the DC-value of the function t(x,y). This fact is not recognized in the art as the DC-value has until now been believed to be represented by numeral 1 in equation (2).

It is still another object of the present invention to provide an improved method and apparatus for phase contrast imaging without the need of attenuating the DC-component of the signal to enhance the information contained in the phase modulated signal.

It is yet another object of the present invention to provide an improved method based on a simple imaging operation with a simple one-to-one mapping between resolution elements of a spatial phase modulator and resolution elements of the generated intensity pattern.

According to the invention a method is provided for synthesizing an intensity pattern with low loss of electromagnetic energy, comprising spatial modulation of electromagnetic radiation with a spatial phase mask for modulation of the phase of the incident electromagnetic radiation by phasor values of individual resolution elements of the spatial phase mask, each phasor value being determined in such a way that 1) the values of the Fourier transformed phasors attains predetermined values for predetermined spatial frequencies, and
2) the phasor value of a specific resolution element of the spatial phase mask corresponds to a distinct intensity level of the image of the resolution element in the intensity pattern, and a spatial phase filter for phase shifting of a part of the electromagnetic radiation, in combination with an imaging system for generation of the intensity pattern by interference in the image plane of the imaging system between the part of the electromagnetic radiation that has been phase shifted by the phase filter and the remaining part of the electromagnetic radiation.

Although, the present method is related to encoding of spatial phase masks in two spatial dimensions (planar encoding), the principles of the method may be utilized for phase encoding in one to three spatial dimensions and/or in the temporal dimension.

The electromagnetic radiation may be of any frequency range of the electromagnetic spectrum, i.e. the gamma frequency range, the ultraviolet range, the visible range, the infrared range, the far infrared range, the X-ray range, the microwave range, the HF (high frequency) range, etc. The present method is also applicable to particle radiation, such as electron radiation, neutron radiation, etc.

Preferably, the electromagnetic radiation is monochromatic or quasi-monochromatic so that the energy of the electromagnetic radiation is concentrated in a narrow frequency bandwidth. As the intensity pattern is synthesized by interference of two electromagnetic waves emitted from a common source of electromagnetic radiation but the phases of which have been changed differently, it is required that the frequency range of the emitted electromagnetic radiation is sufficiently narrow to ensure that the two waves of electromagnetic radiation are coherent so that their superposition generates the desired intensity pattern. If the frequency range is too broad, the two waves will be incoherent and the phase information will be lost as superposition of non-coherent waves results in a summation of the intensities of the two waves. It is required that the difference between individual delays of electromagnetic radiation to be superpositioned is less than the wavelength of the radiation. This is a relaxed requirement that allows the electromagnetic radiation to be relatively broad-banded. For example in the visible range a Xe-lamp or a Hg-lamp can be used as a light source in a system according to the present invention with the advantage compared to a laser light source that the speckle noise is reduced. The requirements of the spatial coherence of the electromagnetic radiation depend upon the space bandwith product of the corresponding system and how close the required system performance is to the theoretically obtainable performance of the system.

Preferably, the electromagnetic radiation is generated by a coherent source of electromagnetic radiation, such as a laser, a maser, a phase-locked laser diode array, etc. However a high pressure arc lamp, such as a Hg lamp, a Xe lamp, etc, may also be used and even an incandescent lamp may be used as a source of electromagnetic radiation in a low performance system.

A spatial phase mask is a component that changes the phase of an electromagnetic wave incident upon it. The spatial phase mask may transmit or reflect the incident electromagnetic wave. Typically, the spatial phase mask is divided into a number of resolution elements each of which modulates the incident electromagnetic wave by changing its phase by a specific predetermined value. The predetermined values are assigned to each resolution element in different ways depending upon the technology applied in the component. For example in spatial light modulators, each resolution element may be addressed either optically or electrically. The electrical addressing technique resembles the addressing technique of solid-state memories in that each resolution element can be addressed through electronic circuitry to receive a control signal corresponding to the phase change to be generated by the addressed resolution element. The optical addressing technique addresses each resolution element by pointing a light beam on it, the intensity of the light beam corresponding to the phase change to be generated by the resolution element illuminated by the light beam.

Spatial phase masks may be realized utilizing fixed phase masks, devices comprising liquid crystals and being based on liquid crystal display technology, dynamic mirror devices, digital micromirror arrays, deformable mirror devices, membrane spatial light modulators, laser diode arrays (integrated light source and phase modulator), smart pixel arrays, etc.

A spatial phase filter is typically a fixed phase mask, such as an optically flat glass plate coated with a dielectric layer at specific positions of the glass plate. However, the spatial phase masks mentioned in the previous section may also be used for spatial phase filters.

The imaging system maps the phase modulating resolution elements of the spatial phase mask on the target surface of the synthesized intensity pattern. It may comprise a 4f-lens configuration (two Fourier transforming lenses utilizing transmission of light or one Fourier transforming lens utilizing reflection of light) or a single imaging lens. However, any optical imaging system providing a filtering plane for the spatial phase filter may be applied in a phase contrast imaging system.

In the method according to the present invention, the synthesized intensity pattern is generated by superposition of two electromagnetic waves in the image plane of the imaging system. The spatial phase mask changes the phase values of an electromagnetic wave incident upon it and the imaging system directs the electromagnetic wave with changed phases reflected from or transmitted through the spatial phase mask towards the spatial phase filter. The phase filter phase shifts a part of the electromagnetic radiation and the imaging system is adapted to superimpose in the image plane the phase shifted part of the electromagnetic radiation with the part of the electromagnetic radiation that is not phase shifted by the spatial phase filter.

According to a preferred embodiment of the invention, the spatial phase mask is positioned at the front focal plane of a lens while the spatial phase filter is positioned in the back focal plane of the lens, whereby a first electromagnetic field at the phase mask is Fourier transformed by the lens into a second electromagnetic field at the phase filter. Thus, specific spatial frequencies of the first electromagnetic field will be transmitted through the spatial phase filter at specific positions of the phase filter. For instance, the energy of the electromagnetic radiation at zero frequency (DC) is transmitted through the phase filter at the intersecting point of the Fourier plane and the optical axis of the lens also denoted the zero-order diffraction region.

It is presently preferred that the spatial phase filter is adapted to phase shift the DC-part of the electromagnetic radiation and to leave the remaining part of the electromagnetic radiation unchanged or, alternatively, to leave the DC-part of the electromagnetic radiation unchanged and to phase shift the remaining part of the electromagnetic radiation. The last alternative is preferred when the energy level of the DC-part of the electromagnetic radiation is so high that the phase shifting part of the phase filter will be destroyed by it. For example in laser cutting, the DC level of the laser beam can be so high that a phase shifting dot positioned at the intersecting point of the DC part of the laser beam at the phase filter would evaporate. It is also possible to block the electromagnetic radiation (no transmittance) in the zero-order diffraction region, however, the DC energy of the radiation is then lost.

Below, an expression of the intensity of the synthesized intensity pattern as a function of the phasor values $\phi(x,y)$ of the phase mask, when the DC-part of the electromagnetic radiation is phase shifted, is deduced.

Electromagnetic radiation incident on the spatial phase mask can be described by a function $A(x,y)$, where $A(x,y)$ is a complex number (amplitude and phase) of the incident field on the point $(x,y)$ of the spatial phase mask. At the point $(x,y)$, the spatial phase mask modulates the phase of the incident radiation with a value $\phi(x,y)$ so that the field after reflection by or transmission through the spatial phase mask may be described by the function $A(x,y)*e^{i\phi(x,y)}$, $e^{i\phi(x,y)}$ being the phasor value of the point $(x,y)$ of the spatial phase mask. As $A(x,y)$ preferably is a constant value over the entire surface of the spatial phase mask, the term is left out of the following equations for simplicity.

The expression of the electromagnetic radiation incident on the spatial phase filter may now be separated into an AC-term and a DC-term. If the DC-term of the field is denoted $\bar{\alpha}$, the AC-term of the field is given by the term $e^{i\phi}{}_{(x,y)}-\bar{\alpha}$. As the spatial phase filter changes the phase of the DC-part of the electromagnetic radiation by $\theta$, the intensity of the synthesized intensity pattern at the image plane of the imaging system is given by:

$$I(x',y')=|e^{i\phi(x',y')}+\bar{\alpha}(e^{i\theta}-1)|^2 \qquad (7)$$

wherein $(x',y')$ is the coordinates of the image of the point $(x,y)$ of the spatial phase mask formed by the imaging system in the image plane.

It should be noted that the second term of the equation is a complex number that adds to the phasors $e^{i\phi(x,y)}$ of the spatial phase mask and may be interpreted as a contrast control parameter for the synthesized intensity pattern $I(x', y')$.

According to a preferred embodiment of the invention, the average value of the phasors is adjusted in order to control the range of intensity levels.

Instead of phase shifting the DC-part of the electromagnetic radiation, it is also possible to synthesize a prescribed intensity pattern by phase shifting other parts of the electromagnetic radiation by adapting the spatial phase filter to phase shift electromagnetic radiation incident upon one or more arbitrary regions of the phase filter and leaving the phase of the remaining part of the electromagnetic radiation unchanged and then superimposing the two parts of the electromagnetic radiation. The corresponding mathematics and the corresponding design procedures for the spatial phase mask and spatial phase filter will of course be more complicated than for the method described in the previous section.

A simple example of phase shifting a part of the electromagnetic radiation of a spatial frequency different from the zero frequency is provided by moving the DC-part of the electromagnetic radiation to another spatial frequency in the Fourier plane (identical to the plane of the spatial phase filter) utilizing an optical component with an appropriate carrier frequency (i.e. a grating or a prism) or, preferably, encoding the function of a grating or a prism into the spatial phase mask, and adapting the spatial phase filter to change the phase of the electromagnetic radiation at this spatial frequency and to leave the phase of the remaining part of the electromagnetic radiation unchanged.

According to another preferred embodiment of the invention, the phase mask is not positioned in the back focal plane of the lens but in the Fresnel region of the lens instead. In this case, the electromagnetic field at the phase filter will be given by a Fresnel transformation of the electromagnetic field at the spatial phase mask. This further complicates the mathematics and the design procedures, for example the term $\bar{\alpha}$ in equation (7) has to be substituted by the value of the Fresnel transformation at the point(s) of phase changes of the phase filter. However, the Fresnel transformation may be calculated from a Fourier transformation by multiplication of the phasor values of the spatial phase mask by a quadratic phase factor followed by a Fourier transformation.

It is an important aspect of the present invention that each intensity level of the synthesized intensity pattern for each resolution element may be generated by at least two different phasor values of a resolution element of the spatial phase mask.

For example, when the spatial phase filter phase shifts the DC-part of the electromagnetic radiation, it will be shown later that, advantageously, the average $\bar{\alpha}$ of the phasors of the resolution elements of the phase mask should be equal to ½ and the value of the phase shift $\theta$ should be equal to $\pi$. In this case, the intensity of the synthesized image pattern at the image $(x',y')$ of the resolution element $(x,y)$ will be given by:

$$I(x',y')=2(1-\cos\phi(x',y')) \tag{8}$$

It is seen that complex conjugate phasors (values of $\phi$ of opposite sign) result in identical intensity levels $I(x',y')$. It can be shown that for any value of the modulus of the average of the phasors $|\bar{\alpha}|$, two phasors exist that will generate identical intensity levels of the synthesized intensity pattern.

Further, if the spatial phase filter phase shifts parts of the electromagnetic radiation different from the DC-part, the phasor value that generates a specific intensity level will depend on the position of the resolution element in question, i.e. the phasor value and the position of the resolution element with that phasor value together define the intensity level at the image of the resolution element in the synthesized intensity pattern. Still, it is true that for each resolution element of the spatial phase mask, each intensity level of the synthesized intensity pattern may be represented by one of two different phasors of complementary phase values.

This freedom of being able to select, for each intensity level to be generated and for each resolution element of the spatial phase mask, one of two phasors is used to control the phase of the Fourier transform of the phasors at specific spatial frequencies by selection of phasors with appropriate phase values to ensure two intervals of biunique functional dependence between phasor values and corresponding intensity values.

This freedom of choice of phasors may be utilized to select phasors of neighbouring resolution elements of the spatial phase mask with a maximum difference between them, thereby generating an electromagnetic radiation emitted from the phase mask with a maximum content of high spatial frequencies which will generate a good separation of the DC part of the electromagnetic radiation from its AC part. However, any other strategy of selecting between two possible phasor values of each resolution element may be chosen to generate a desired spatial frequency content of the electromagnetic radiation.

Preferably, the phase of the Fourier transform of the phasors at specific spatial frequencies is adjusted in order to control whether the relation between each phasor and the corresponding intensity level is a monotonic increasing or a monotonic decreasing function.

Below, a set of different methods are described that are provided according to the present invention for adjustment of the modulus of the Fourier transform of the phasors at specific spatial frequencies to attain a prescribed value. If convenient, the methods may be combined.

According to one of the methods, the individual phasors of the resolution elements of the phase mask are adjusted by a constant value until the desired value of the modulus of the Fourier transform of the phasors at specific spatial frequencies is attained while maintaining prescribed relative intensity levels between intensities of resolution elements of the intensity pattern, i.e. iteratively.

According to another method, the individual phasors of the resolution elements of the phase mask are adjusted utilizing histogram techniques known from image processing. A histogram is a bar chart showing the number of resolution elements of the synthesized intensity pattern with a specific intensity value as a function of the intensity value. Any histogram technique, such as histogram equalization, adapting the histogram to a predetermined distribution, etc., may be used iteratively until the modulus of the Fourier transform of the phasors at specific spatial frequencies attain the prescribed value.

According to yet another method, the phasor pattern of the phase mask is spatially scaled in order to adjust the modulus of the Fourier transform of the phasors at specific spatial frequencies.

According to still another method, the modulus of the Fourier transform of the phasors at specific spatial frequencies is adjusted utilizing half tone coding techniques, such as raster techniques, area ratio modulation, spot diameter modulation, etc.

It is seen from the description above that the intensity levels may differ from one synthesized intensity pattern to the next as a consequence of the adjustments of the modulus of the Fourier transform of the phasors at specific spatial frequencies. Thus, it is preferred to control the power of the radiation source in dependence of the intensity range of the intensity pattern so that a sequence of different intensity patterns show uniform intensity levels.

According to a preferred embodiment of the invention, the shape of the phase filter is adapted to match the spatial frequency content of the phasors of the spatial phase mask, e.g. to optimize the desired separation of the part of the electromagnetic radiation to be phase filtered from the remaining part of the electromagnetic radiation.

It is within the scope of the present invention that the imaging system further comprises zooming means for variable scaling of the synthesized intensity pattern. The zooming of the imaging system may be dynamically controllable, e.g. in response to the scaling of the pattern of phasor values of the phase mask.

According to the present invention, the power of the radiation source may be controllable in response to the spatial scaling of the pattern in the phase mask and/or the zooming of the focusing system.

In order to provide a compact and integrated system according to the present invention, the optical function of a Fourier-transforming lens is encoded into the phasors of the spatial phase mask. The Fourier transforming lens may be refractively or diffractively encoded into the phase mask.

Similarly, the optical function of an output lens may be encoded into the phase filter either refractively or diffractively.

Further, a compensation may be encoded into the phasor values of the spatial phase mask so that part of the electromagnetic radiation modulated by the phase mask has a substantially flat intensity profile in the image plane. Without this compensation, part of the electromagnetic radiation modulated by the phase mask will have a flat profile with perturbations resulting from the phase filtering superpositioned upon it. This may cause "ringings" (oscillations) at the edges of the synthesized intensity pattern.

According to another preferred embodiment of the invention, the source of electromagnetic radiation comprises one or more light sources of different wavelengths corresponding to three different colours, such as red, green and blue, for generation of intensity patterns of arbitrary colours. Further, several independent systems each one illuminated by its own wavelength can be combined into a single multi-wavelength system.

DETAILED DESCRIPTION OF PREFERRED EMBODIMENTS

Figure 1:
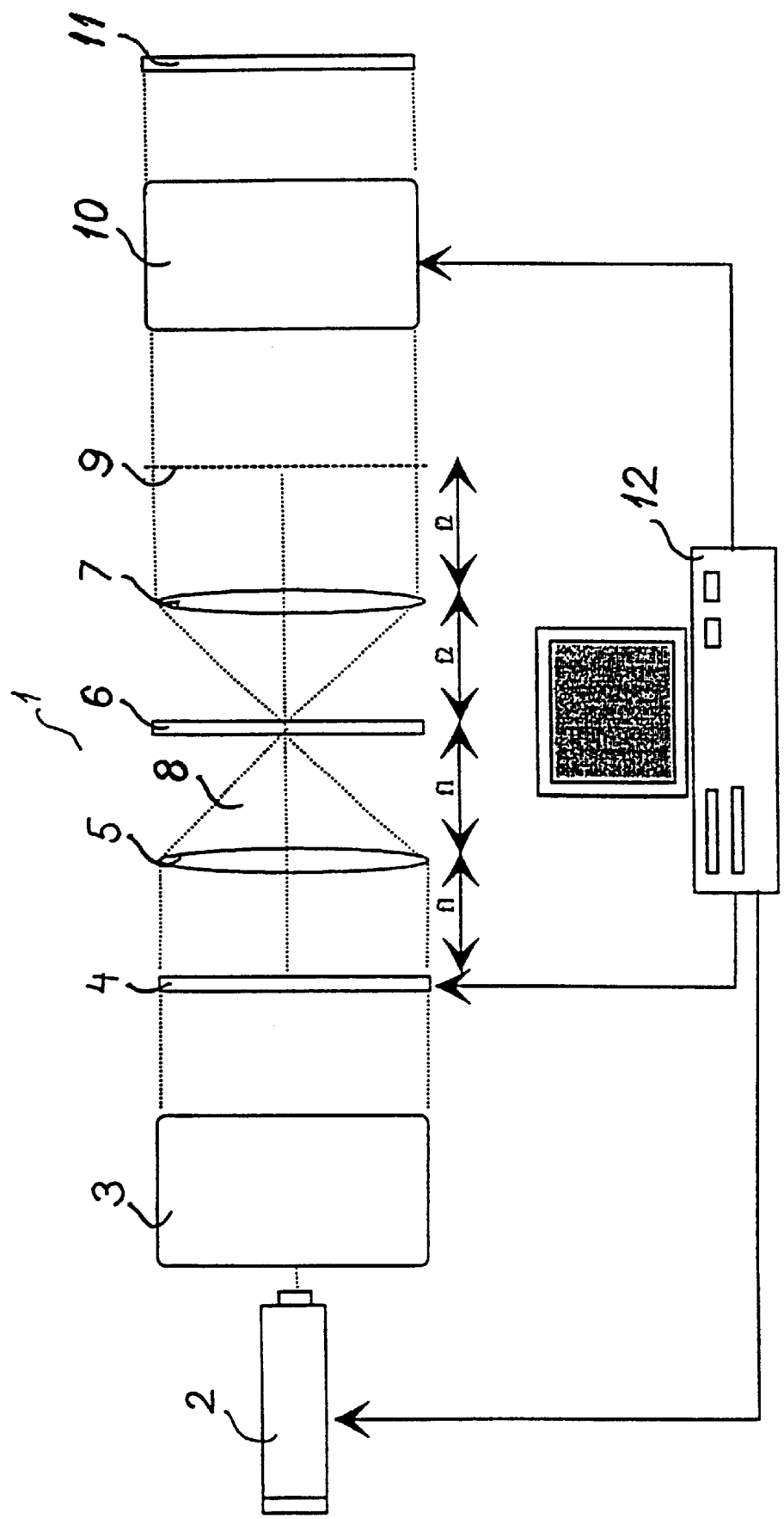
FIG. 1 shows a 4f optical system for phase contrast imaging.

FIG. 1 shows a 4f phase contrast imaging system (1). A laser (2) emits a light beam which is expanded by a beam expander (3) into a plane light wave of uniform intensity and directs it towards a spatial phase mask (4). The light beam is transmitted through the spatial phase mask (4) and a Fourier transforming lens (5). The spatial phase mask is positioned in the front focal plane of the lens (5) and a spatial phase filter (6) is positioned in the back focal plane of the lens (5) that is also the front focal plane of a lens (7). The Fourier transforming lenses (5, 7) need not have identical focal lengths. Different focal lengths lead to a magnification ratio different from one. The phase filter (6) phase shifts the zero order diffraction part (8) of the light phase modulated by the spatial phase mask (4). The synthesized intensity pattern is generated in the back focal plane (9) of the lens (7) and a dynamic focusing system (10) images the synthesized intensity pattern onto a focusing plane (11).

The optical system is controlled by a computer (12). The computer (12) comprises interface means for addressing each of the resolution elements of the phase filter (4) and transmitting a phasor value to the addressed resolution element. Further, the computer (12) comprises laser control means for controlling the power of the laser (2) and imaging control means for controlling the focusing and the image ratio of the dynamic focusing system (10). The computer (12) also comprises input means, such as a keyboard, a diskette drive, an optical disc drive, a network interface, a modem, etc, for receiving an image pattern to be synthesized by the system (1). From the received image pattern, the computer is adapted to calculate phasor values to be transmitted to the resolution elements of the phase mask, e.g. based on a histogram technique as described herein. Optionally, the phase shift of the phase filter (6) is adjustable and controllable by optional phase control means of the computer (12) which may be further adapted to adjust the phase shift, e.g. utilizing equation (18).

Figure 2:
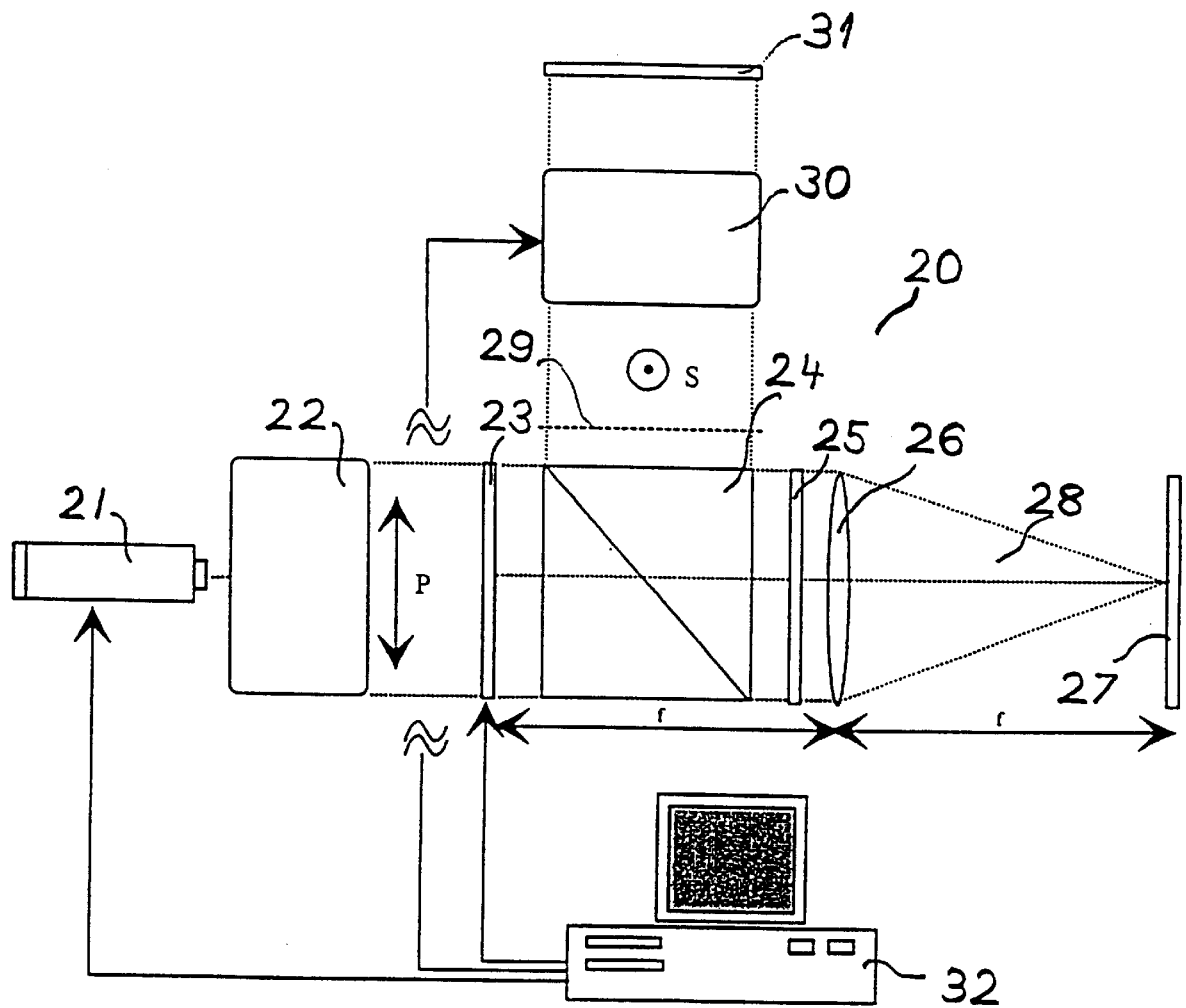
FIG. 2 shows a 2f optical system for phase contrast imaging.

FIG. 2 shows a 2f phase contrast imaging system (20). A laser (21) emits a light beam which is expanded by a beam expander (22) into a plane light wave of uniform intensity and directs it towards a spatial phase mask (23) and a polarization beam splitter (24) and a quarter-wave plate (25). The polarization beam splitter (24) and the quarter-wave plate (25) allows beam-splitting of light of a specific linear polarization without the power loss associated with conventional beam-splitters due to splitting of the beam in both directions of transmission through the beam-splitter. After transmission through the polarization beam splitter (24) and the quarter-wave plate (25), the light beam is transmitted through a Fourier transforming lens (26) and is reflected from a spatial phase filter (27). The spatial phase mask (23) is positioned in the front focal plane of the lens (26) and the spatial phase filter (27) is positioned in the back focal plane of the lens (26). The phase filter (27) phase shifts the zero order diffraction part (28) of the light that is phase encoded by the spatial phase mask (23). The synthesized intensity pattern is generated in the back focal plane (29) of the lens (26) and a dynamic focusing system (30) images the synthesized intensity pattern onto a focusing plane (31). As described for the system shown in FIG. 1, the system (20) is controlled by a computer (32).

Figure 3:
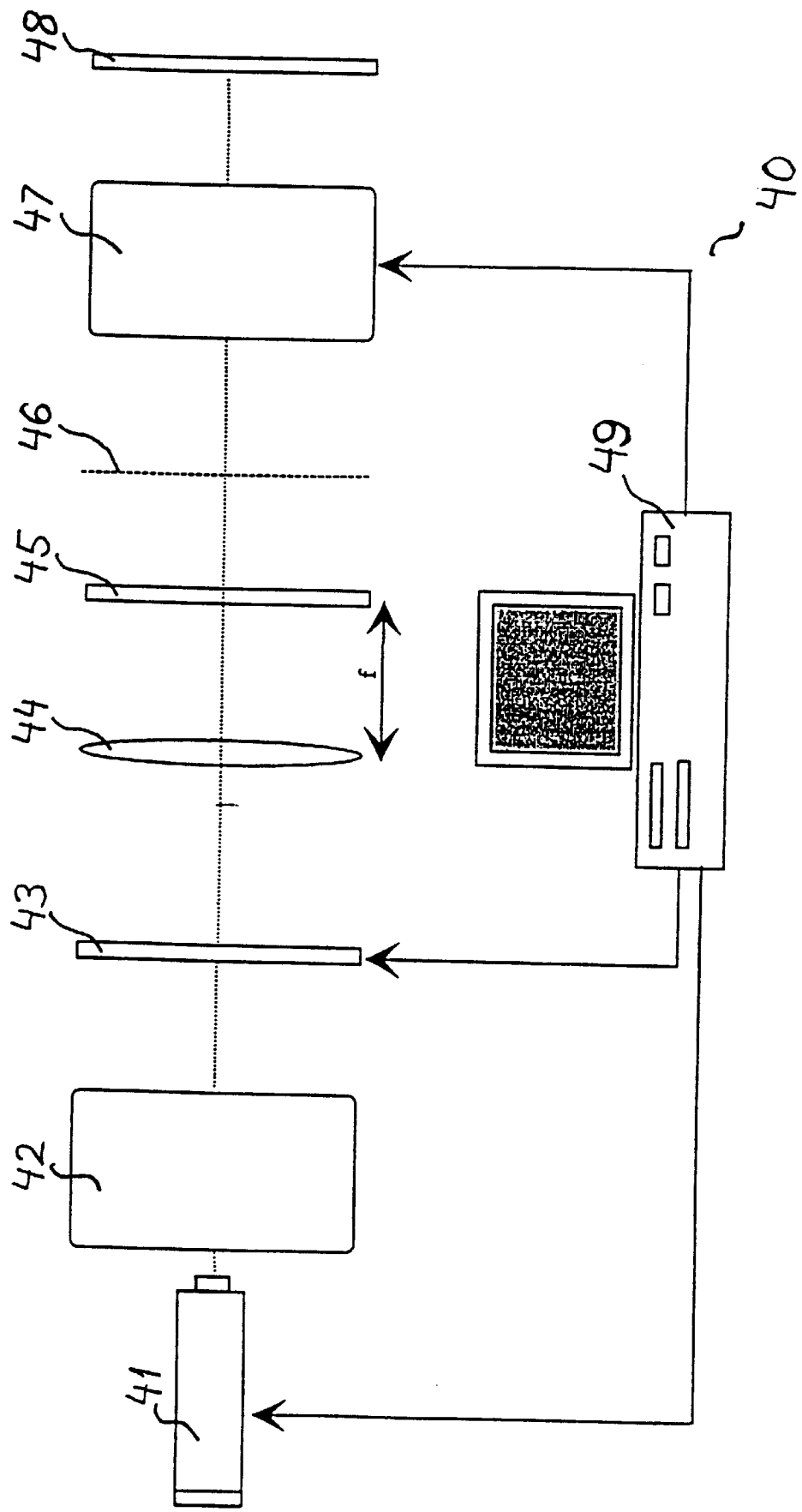
FIG. 3 shows a 1f optical system for phase contrast imaging.

FIG. 3 shows a 1f phase contrast imaging system (40). A laser (41) emits a light beam which is expanded by a beam expander (42) into a plane light wave of uniform intensity and directs it towards a spatial phase mask (43). The light beam is transmitted through the spatial phase mask (43) and an image forming lens (44). A phase filter (45) positioned in the back focal plane of the lens (44) phase shifts the zero order diffraction part of the light phase encoded by the spatial phase mask (43). The synthesized intensity pattern is generated in the image plane (46) of the lens (44) and a dynamic focusing system (47) images the synthesized intensity pattern onto a focusing plane (48). As described for the system shown in FIG. 1, the system (40) is controlled by a computer (49).

Figure 4:
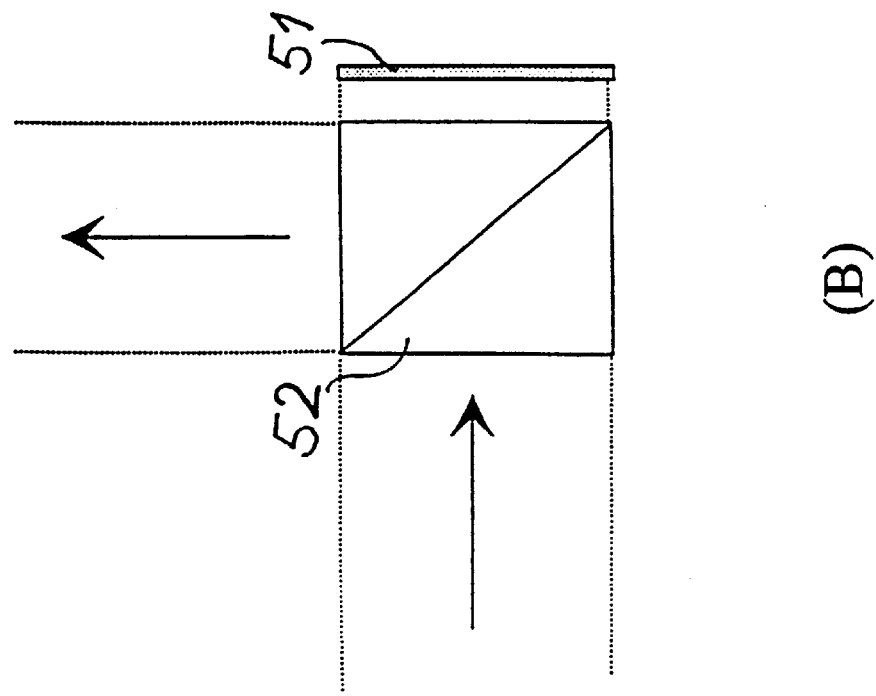
FIG. 4 shows (A) off-axis read-out of reflective SLM and (B) on-axis read-out of reflective SLM.
Figure 4:
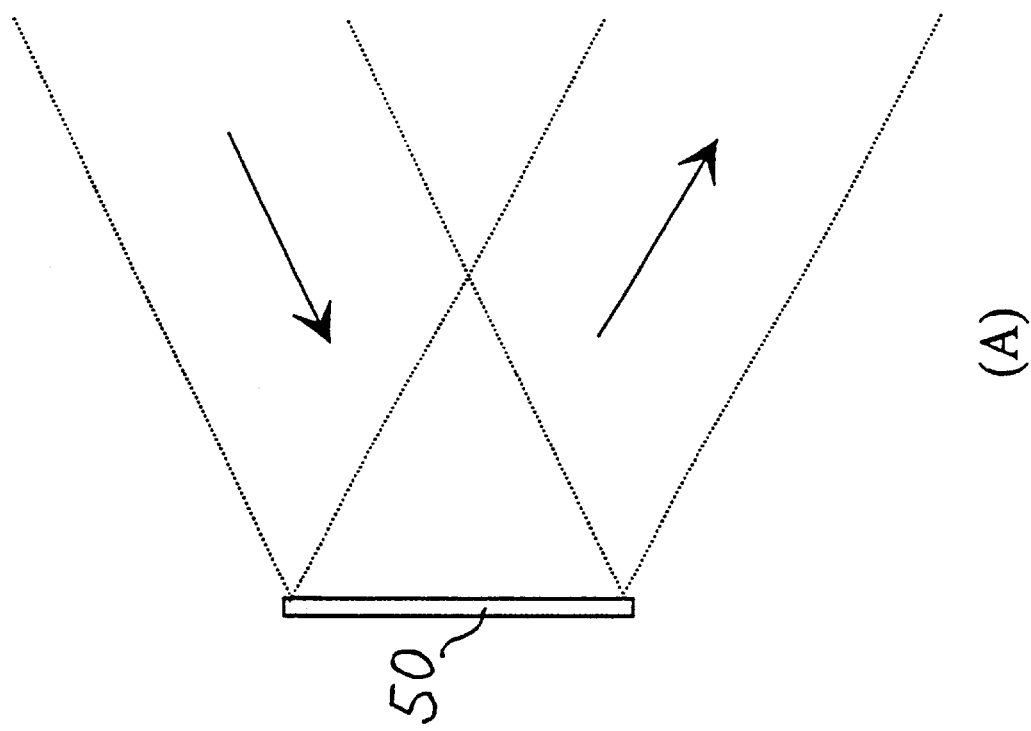

FIG. 4 shows details of (A) an off-axis read-out of a reflective phase mask (50) (or a spatial light modulator) and of (B) an on-axis read-out of a reflective phase mask (51) with a beam splitter (52). Both configurations (A, B) may be utilized in the systems shown in FIGS. 1–3.

Phase Encoding For DC Phase Filtering

In the following an example of encoding a spatial phase mask and a spatial phase filter will be given based on a system filtering in the DC-frequency range. The system chosen in this example is based on a 4-f lens configuration as shown in FIG. 1 and illuminated by electromagnetic radiation in the visible frequency domain, hereafter simply denoted as light radiation.

Assuming that the illuminating light is monochromatic and has a substantially flat amplitude profile we obtain the following spatial amplitude distribution emitted from the spatial phase mask:

$$a(x, y) = \text{rect}\left(\frac{x}{\Delta x}, \frac{y}{\Delta y}\right) \exp(i\phi(x, y)) \quad (9)$$

where $\alpha(x,y) = \exp(i\phi(x,y))$ represent the spatially encoded phasor values and $\Delta x \Delta y$ is the area of the input phase modulating spatial light modulator.

It turns out to be convenient to separate $\alpha(x,y)$ into two terms describing a spatially invariant DC-value, $\bar{\alpha}$, and a spatially varying AC-contribution $\Delta\alpha(x,y)$. The DC-value can be found as:

$$\bar{\alpha} = \frac{1}{\Delta x \Delta y} \iint_{\Delta x \Delta y} \exp(i\phi(x, y)) dx\, dy \quad (10)$$

Subsequently the AC-term is expressed by:

$$\Delta\alpha(x, y) = \exp(i\phi(x, y)) - \frac{1}{\Delta x \Delta y} \iint_{\Delta x \Delta y} \exp(i\phi(x, y)) dx\, dy \quad (11)$$

The separation of $\alpha(x,y)$ into a spatially invariant DC-term and a spatially varying AC-term is an important point and will be used throughout the remaining part of this example, especially in the description of the spatial filtering procedure.

The spatial filter utilized in this example is chosen as a circular phase contrast filter (different transverse shapes can also be used) centered around origo in the the spatial frequency domain, denoted by coordinates $(f_x, f_y)$:

$$T(f_r) = 1 + (\exp(i\theta) - 1)\text{circ}\left(\frac{f_r}{\Delta f_r}\right), \quad (12)$$

where $f_x = \sqrt{f_x^2 + f_y^2}$ denotes radial spatial frequency and $\Delta f_x$ describes the size of the circular (circ) phase filter.

In the spatial frequency domain (the filtering plane) the Fourier transformation ($\mathfrak{F}$) of the spatially modulated light radiation from the spatial phase mask is present. The filtering operation on the Fourier transformed light radiation performed by the spatial phase contrast filter can be expressed as a simple point-by-point multiplication procedure. Subsequently the spatially filtered light is inverse Fourier transformed ($\mathfrak{F}^{-1}$) by the second Fourier lens (Fourier transformation and reflected output coordinates) and the resulting spatial amplitude distribution in the image plane (with coordinates $(x',y')$) can accordingly be written as:

$$o(x', y') = a(x', y') + (\exp(i\theta) - 1)\mathfrak{F}^{-1}\left(\mathfrak{F}(a(x, y))\text{circ}\left(\frac{f_r}{\Delta f_r}\right)\right) \quad (13)$$

$$\cong a(x', y') + \bar{\alpha}(\exp(i\theta) - 1)\text{rect}\left(\frac{x'}{\Delta x}, \frac{y'}{\Delta y}\right)$$

$$= [\exp(i\phi(x', y')) + \bar{\alpha}(\exp(i\theta) - 1)]\text{rect}\left(\frac{x'}{\Delta x}, \frac{y'}{\Delta y}\right)$$

Within the illumination-region, $(x',y') \in \mathfrak{R}'$, outlined by $$\text{rect}\left(\frac{x'}{\Delta x}, \frac{y'}{\Delta y}\right),$$

one obtains:

$$|o(x', y')|^2 \cong 1 + 4|\bar{\alpha}|\sin\left(\frac{\theta}{2}\right)\left[|\bar{\alpha}|\sin\left(\frac{\theta}{2}\right) - \sin\left(\phi_{\bar{\alpha}} - \phi(x', y') + \frac{\theta}{2}\right)\right] \quad (14)$$

Requiring that $|o(x_o',y_o')|^2 \equiv 0$ corresponding to complete darkness as the lowest intensity level in regions $(x_o',y_o') \in \mathfrak{R}_o'$ implies:

$$1 + 4|\bar{\alpha}|\sin\left(\frac{\theta}{2}\right)\left[|\bar{\alpha}|\sin\left(\frac{\theta}{2}\right) - \sin\left(\phi_{\bar{\alpha}} - \phi_o + \frac{\theta}{2}\right)\right] = 0 \quad (15)$$

where the abbreviation $\phi_0 = \phi(x_o',y_o')$ has been used.

The solutions to Eq. (15) are given by:

$$|\bar{\alpha}| = \frac{\sin\left(\phi_{\bar{\alpha}} - \phi_o + \frac{\theta}{2}\right) \pm \sqrt{\sin^2\left(\phi_{\bar{\alpha}} - \phi_o + \frac{\theta}{2}\right) - 1}}{2\sin\left(\frac{\theta}{2}\right)} \quad (16)$$

The requirement $0 < |\bar{\alpha}| < 1$ implies that:

$$\sin^2\left(\phi_{\bar{\alpha}} - \phi_o + \frac{\theta}{2}\right) = 1 \Rightarrow \quad (17)$$

$$\theta = \pi - 2(\phi_{\bar{\alpha}} - \phi_o) + p2\pi, \quad p = 0, \pm 1, \pm 2, \ldots$$

leading to $$|\bar{\alpha}| = \frac{\pm 1}{2\sin\left(\frac{\theta}{2}\right)} \Rightarrow \frac{1}{2} \le |\bar{\alpha}| < 1 \quad (18)$$

where the +sign is for $\theta$-values in the interval:

$$\theta \in \left]\frac{\pi}{3}; \frac{5\pi}{3}\right[ + p_{even}2\pi \quad (19)$$

and the −sign is for θ-values:

$$\theta \in \left]\frac{\pi}{3}; \frac{5\pi}{3}\right[ + p_{odd} 2\pi \quad (20)$$

The corresponding interval for $(\phi_{\overline{\alpha}} - \phi_o)$ is:

$$(\phi_{\overline{\alpha}} - \phi_o) \in \left]\frac{\pi}{3}; -\frac{\pi}{3}\right[ \quad (21)$$

Inserting the expression for $|\overline{\alpha}|$, one obtains the simple intensity expression:

$$|o(x', y')|^2 = 2\left[1 \mp \sin\left(\phi_{\overline{\alpha}} - \phi(x', y') + \frac{\theta}{2}\right)\right] \quad (22)$$

where $$\iint_{\Delta x \Delta y} \exp(i\phi(x,y)) dx dy = \Delta x \Delta y |\overline{\alpha}| \exp(i\phi_{\overline{\alpha}}) \quad (23)$$

The phase-only transformations imply that energy is conserved:

$$\iint_{\Delta x \Delta y} |o(x', y')|^2 dx' dy' = \iint_{\Delta x \Delta y} |a(x, y)|^2 dx dy = \Delta x \Delta y \quad (24)$$

A special case:

The most convenient choice for $\overline{\alpha}$ is: $\overline{\alpha} = \frac{1}{2}$ (implying that $\theta = \pi + P_{even} 2\pi$), so that the output intensity can be described as:

$$|o(x',y')|^{1/2} = 2[1 - \cos(\phi(x',y'))] \quad (25)$$

In this case the phaseointensity mapping is described by the intervals $[0;\pi] \to [0;4]$.

By setting $\overline{\alpha} = \frac{1}{2}$ one obtains the following requirement to the phase function $\phi(x,y)$:

$$\begin{cases} \iint_{\Delta x \Delta y} \cos(\phi(x, y)) dx dy = \frac{\Delta x \Delta y}{2} \\ \iint_{\Delta x \Delta y} \sin(\phi(x, y)) dx dy = 0 \end{cases} \quad (26)$$

Inserting the expression for $|o(x',y')|^2$ in Eq. (24) yields:

$$2\iint_{\Delta x \Delta y} [1 - \cos(\phi(x', y'))] dx' dy' = \Delta x \Delta y \quad (27)$$

in accordance with the first of the integral expressions in Eq. (26).

Encoding procedure:

A given intensity distribution (image) $|o(x',y')|^2$ is desired at the output side of the optical setup.

Pixellation of the image, that is generally represented in the greyscale range: [0;gmax], provides the relation:

$$\iint |o(x', y')|^2 dx' dy' = \Delta x \Delta y \Rightarrow \sum_{ij} |o(i, j)|^2 = \frac{gmax}{4} \# pix_{(\Delta x \Delta y)}.$$

The histogram for the desired image $|o(i,j)|^2$ is adjusted (adj) within the greyscale range [0;gmax], so that the previous point is fulfilled:

$$|o(i,j)|^2 \to |o(i,j)|^2_{adj}.$$

The phase values can now be calculated as:

$$\phi(i, j) = \arccos\left(1 - \frac{2|o(i, j)|^2_{adj}}{gmax}\right).$$

As before pixellation provides the relation:

$$\sum_{ij} \sin(\phi(i, j)) = 0.$$

The previous point can now be fulfilled by complex conjugating half the input pixels having the same phase value in the phase histogram.

The phase conjugate phase flipping provides a valuable tool (an extra degree of freedom) for manipulating the spatial frequency content in order to optimize the separation of low and high frequency terms at the filter plane.

The scheme is robust to constant phase errors across the input spatial phase modulator, since Eq. (22) is a function of the difference: $\phi_{\overline{\alpha}} - \phi(i,j)$, only. Furthermore, small variations in the individual pixel phase values do not introduce any detrimental effects because the average value $\overline{\alpha}$, is a result of a very large phasor sum.

If the desired intensity distribution is too small to include all energy, that is, the histogram is scaled to maximum and the left hand side of Eq. (24) is still smaller than the right hand side, then the input phase object can be scaled until Eq. (24) is fulfilled. In order to obtain a scale invariant output intensity level a dynamic focusing system is needed. Similarly, intensity invariance can be obtained by controlling the radiated power from the light source. Alternatively, one can ignore the residual background illumination and obtain intensity levels with a gain factor of 9⁻ (background constant equal to 1⁻) for narrow generally shaped line structures (e.g. Eq. (14)).

EXAMPLE 1

A very simple example illustrating the individual steps in the above procedure will be given below. To simplify the example it will be considered in one dimension only. The starting point for encoding the spatial phase mask in this example is based on the following parameters:

$$\begin{cases} \overline{\alpha} = 0.5 \\ \theta = \pi \\ \# pix_{(\Delta x)} = 14 \\ gmax = 4 \end{cases} \quad (28)$$

Figure 5:
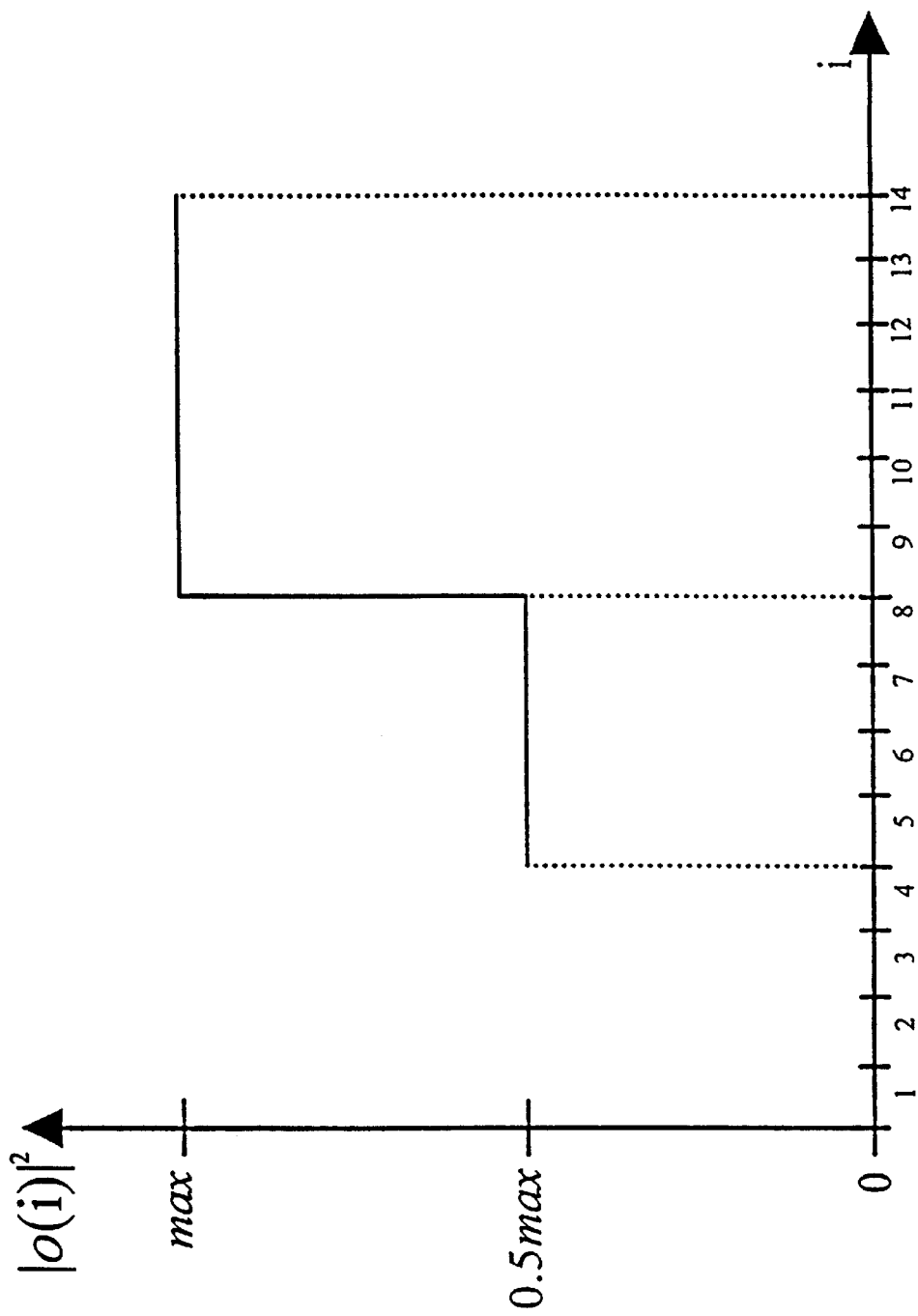
FIG. 5 shows schematically an example of a prescribed intensity pattern in 1D.

Consider the pixellated 3-step function shown in FIG. 5 to be synthesized in the image plane as an intensity distribution. From the above choices of parameters one obtains the simple relation between phase values in the spatial phase mask and the image intensity values:

$$|o(i)|^2 = 2[1-\cos(\phi(i))] \quad (29)$$

To proceed from here it necessary to calculate the accumulated intensity $$\sum_i |o(i)|^2$$

in the image to be synthesized. The accumulated intensity is easily calculated from an image histogram where the x-axis represents greylevel value and the y-axis represents the amount of pixels in the image at a given greylevel value. By use of a histogram $$\sum_i |o(i)|^2$$

is simply found as the weighted sum of all greylevel values (x-axis) multiplied by their pixel counting (y-axis). This describes, so to speak, the "weight" of the image. In this simple example histogram calculations are not needed since we only have 3 greylevels with well-defined separations.

The value for the accumulated intensity has to obey the equality:

$$\sum_i |o(i)|^2 = \frac{gmax}{4} \# pix_{(\Delta x)} = \# pix_{(\Delta x)} = 14 \quad (30)$$

From FIG. 5 we obtain:

$$\sum_i |o(i)|^2 = 4 \text{ pixels} \cdot 0 + 4 \text{ pixels} \cdot (0.5\text{max}) + 6 \text{ pixels} \cdot \text{max} = 8\text{max} \quad (31)$$

So that the value for max can be estimated to be: 7

$$\text{max} = \frac{7}{4} \quad (32)$$

The corresponding adjusted intensity levels, $|o(i)|_{adj}^2$, are therefore: 7/4, 7/8 and 0. These values can now be utilized to calculate the phase values of the spatial phase mask from the relation:

$$\phi(i) = \arccos\left(1 - \frac{2|o(i)|_{adj}^2}{gmax}\right) = \arccos\left(1 - \frac{|o(i)|_{adj}^2}{2}\right) \quad (33)$$

where from we obtain the three phase values: 1.45 rad. 0.97 rad. and 0 rad.

The last step needed in order to encode the spatial phase mask is that the following equality is fulfilled:

$$\sum_i \sin(\phi(i)) = 0 \quad (34)$$

Figure 6:
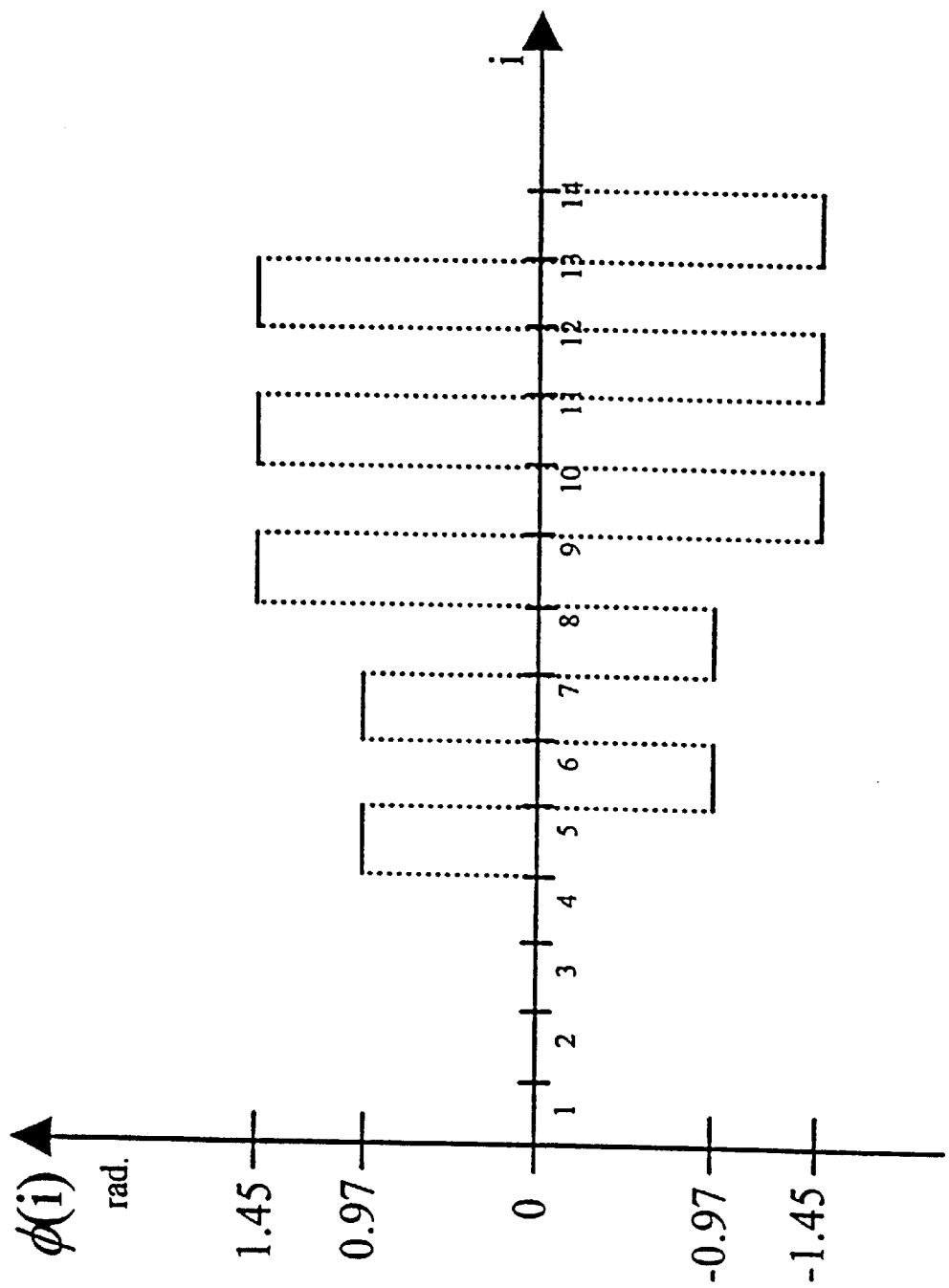
FIG. 6 shows schematically the resulting phase encoding corresponding to FIG. 5.

Since we have the choice to use complex conjugate phasor values (two phasors giving the same intensity level) many approaches can be taken from here. A simple approach is to flip every second phasor with its complex conjugate value as shown in FIG. 6. The final phase values used in the phase masks are accordingly: ±1.45 rad. ±0.97 rad. and 0 rad.

As the last step we can check whether the criteria: $\bar{\alpha}=\frac{1}{2}$, is actually fulfilled with the chosen phasor encoding:

$$\bar{\alpha} = \frac{1}{14}(4\exp(i0) + 2\exp(i0.97) + \quad (35)$$
$$3\exp(i1.45) + 2\exp(-i0.97) + 3\exp(-i1.45)) \cong 1/2$$

General Phase Correction Procedure Integrated With the Phase Encoding

In Eq. (14) we obtained an analytic relation between the phase values in the spatial phase mask and the resulting intensity distribution, within the region (x',y')∈ℜ':

$$|o(x', y')|^2 \cong 1 + 4|\bar{\alpha}|\sin\left(\frac{\theta}{2}\right)\left[|\bar{\alpha}|\sin\left(\frac{\theta}{2}\right) - \sin\left(\phi_{\bar{\alpha}} - \phi(x', y') + \frac{\theta}{2}\right)\right] \quad (36)$$

The analysis leading to the above relation was based on the assumption that $|\bar{\alpha}|$ is a constant value within the ℜ'-domain. In other words, the following approximation was applied:

$$\mathcal{F}^{-1}\left(\mathcal{F}(a(x, y))\text{circ}\left(\frac{f_r}{\Delta f_r}\right)\right) \cong \bar{\alpha}\text{rect}\left(\frac{x'}{\Delta x}, \frac{y'}{\Delta y}\right) \quad (37)$$

However, for certain spatial filter parameters the lefthand side of this expression will not be a space invariant constant value throughout the whole ℜ'-domain but will instead manifest slowly variations/oscillations. This will introduce small errors in the final superposition between the phase filtered DC-value and the direct propagated AC-signal. In order to circumvent this problem a technique is needed that can counteract the distortions by use of phase-only encoding in the components already present in the system. In what follows a procedure for integrating predistortion that counteracts the above mentioned distortions will be described that is purely based on modifying the phasor values in the spatial phase mask at the input side of the system. The method can also counteract other types of distortions inherent in a practical implementation of the system. Furthermore, the method can be applied in systems filtering at other spatial frequencies than DC.

Procedure:

When encoding the input phase function it is helpful to have a reverse equation, expressing the input phase distribution as a function of an adjusted (electronic) image grey-level distribution, $I_{slm}$, addressing the input spatial light modulator:

$$\frac{4I_{slm}}{gmax} \cong 1 + 4|\bar{\alpha}(x', y')|\sin\left(\frac{\theta}{2}\right)\left[|\bar{\alpha}(x', y')|\sin\left(\frac{\theta}{2}\right) - \sin\left(\phi_{\bar{\alpha}}(x', y') - \phi(x', y') + \frac{\theta}{2}\right)\right] \quad (38)$$

where it has been taken into account that $\bar{\alpha}(x',y')$ is not considered as a constant but manifests a smooth oscillating behaviour within the optical image domain. The maximum value of $I_{slm}$ is denoted gmax.

Now, one can derive a formula for the grey-level correction, $\Delta I_{slm}(x',y')$, that one needs to apply in order to encode a phase function that compensates for the spatial variation of the average phase value $\bar{\alpha}(x',y')$:

$$\begin{cases} \dfrac{4I_{slm}(x', y')}{gmax} \cong 1 + 4|\overline{\alpha}(x', y')|\sin\left(\dfrac{\theta}{2}\right) \\ \qquad \left[|\overline{\alpha}(x', y')|\sin\left(\dfrac{\theta}{2}\right) - \sin\left(\phi_{\overline{\alpha}}(x', y') - \phi(x', y') + \dfrac{\theta}{2}\right)\right] \\ \phi(x', y') = a\cos\left(1 - \dfrac{2(I_{slm}(x', y') + \Delta I_{slm}(x', y'))}{gmax}\right) \end{cases} \quad (39)$$

where the second relation has been derived from the first by setting $\overline{\alpha}=\tfrac{1}{2}$ and $\theta=\pi$.

By inserting the second relation in the first expression one gets:

$$\Delta I_{slm}(x', y') = \left(\dfrac{1}{2|\overline{\alpha}(x', y')|} - 1\right)I_{slm}(x', y') - \dfrac{gmax}{2|\overline{\alpha}(x', y')|}\left(|\overline{\alpha}(x', y')| - \dfrac{1}{2}\right)^2 \quad (40)$$

This formula is however not directly useful because it is related to the histogram adjusted grey-level distribution denoted by $I_{slm}$.

One needs a formula that relates the above correction term to the original input grey-level distribution I(x,y) that has not been modified by histogram adjustments. This is important since the effect of the grey-level corrections also have to be incorporated in the procedure of histogram adjustments.

The histogram scaling gives:

$$I(x, y) = \dfrac{I_{max}}{I_{slm, max}} I_{slm}(x, y) \quad (41)$$

where $I_{max}$ and $I_{slm,max}$ are the maximum grey-level values occurring in the original and the adjusted electronic grey-level distributions respectively.

Similarly, one can apply this relation to the intensity correction term $\Delta I_{slm}$ and obtain:

$$\tilde{I}(x, y) = I(x, y) + \Delta I(x, y) = \dfrac{I_{max}}{I_{slm, max}}(I_{slm}(x, y) + \Delta I_{slm}(x, y)) \quad (42)$$

resulting in:

$$\tilde{I}(x, y) = \dfrac{1}{2|\overline{\alpha}(x, y)|}\left(I(x, y) - gmax\dfrac{I_{max}}{I_{slm, max}}\left(|\overline{\alpha}(x, y)| - \dfrac{1}{2}\right)^2\right) \quad (43)$$

In order to have enough dynamic range in grey-levels for the correction term one can derive an inequality from the above relation by using the fact that $\tilde{I}_{max} \leq gmax$:

$$\dfrac{1}{2|\overline{\alpha}_{min}|}\left(I_{max} - gmax\dfrac{I_{max}}{I_{slm, max}}\left(|\overline{\alpha}_{min}| - \dfrac{1}{2}\right)^2\right) \leq gmax \quad (44)$$

or $$I_{max} \leq \dfrac{2|\overline{\alpha}_{min}| \cdot gmax}{\left(1 - \dfrac{gmax}{I_{slm, max}}\left(|\overline{\alpha}_{min}| - \dfrac{1}{2}\right)^2\right)} \quad (45)$$

Since the first term is the dominating term in the expression for the intensity correction it will in practice be sufficient just to have the much simpler corrections:

$$\begin{cases} \tilde{I}(x, y) = \dfrac{I(x, y)}{2|\overline{\alpha}(x, y)|} \\ I_{max} \leq 2|\overline{\alpha}_{min}| \cdot gmax \end{cases} \quad (46)$$

Proposed Applications:

Laser machining, marking, branding, trimming, hardening, scribing, labeling, welding and cutting on two- and three-dimensional surfaces especially by use of $CO_2$ and Nd:YAG laser based systems. The main advantage is that energy is not absorbed in the system (thereby preventing damage of the optical hardware) and this nonabsorbed energy is instead utilized to increase the intensity level of the desired light distribution in the image plane. High power can be delivered to selected regions on a work piece simultanously.

Efficient and dynamic spot-array generators based on phase contrast imaging. In order to provide bias or holding beams for arrays of optoelectronic elements, such as bistable elements, photonic switches and smart pixels.

Generation of structured light (lossless) for machine vision applications. E.g. periodic and skew periodic mesh grid illumination that can be updated in parallel.

Photolithographic applications (laser 3D direct writing in parallel without the need for sequential scanning). E.g. high power laser direct writing of waveguides in Ge-doped silica.

Spatial light intensity modulation in general by use of pure phase modulation (radiation focusators).

Laser beam shapinq (dynamic).

Highly efficient parallel image projection without the need for a laser scanning device.

Dynamic Infrared Scene Projection (DIRSP).

Exposure device for grating and mask production.

LIDAR applications.

Laserprinting in parallel.

Lasershow applications.

Atmosphere research.

I claim:

1. A phase contrast imaging method of synthesizing an intensity pattern I(x',y') of an image, comprising the steps of pixellating the intensity pattern I(x',y') in accordance with the disposition of resolution elements (x,y) of a spatial phase mask (4, 23, 43) having a plurality of individual resolution elements (x,y), each resolution element (x,y) modulating the phase of electromagnetic radiation incident upon it with a predetermined phasor value $e^{i\phi(x,y)}$, radiating electromagnetic radiation towards the spatial phase mask (4, 23, 43), Fourier or Fresnel transforming the modulated electromagnetic radiation, phase shifting in a region of spatial frequencies comprising DC in the Fourier or Fresnel plane, the modulated electromagnetic radiation by a predetermined phase shift value $\theta$ in relation to the remaining part of the electromagnetic radiation, and forming the intensity pattern by Fourier or Fresnel transforming, respectively, the phase shifted Fourier or Fresnel transformed modulated electromagnetic radiation, whereby each resolution element (x,y) of the phase mask (4, 23, 43) is imaged on a corresponding resolution element (x',y') of the image, calculating the phasor values $e^{i\phi(x,y)}$ of the phase mask (4, 23, 43) and the phase shift value $\theta$ in accordance with $$I(x',y') = |e^{i\phi(x',y')} + \overline{\alpha}(e^{i\theta} - 1)|^2$$

for selected phase shift values θ, $\overline{\alpha}$ being the average of the phasors $e^{i\phi(x,y)}$ of the resolution elements of the phase mask (4, 23, 43), selecting, for each resolution element, one of two phasor values which represent a particular grey level, and supplying the selected phasor values $e^{i\phi(x,y)}$ to the resolution elements (x,y) of the spatial phase mask (4, 23, 43).

2. A method according to claim 1, wherein the step of calculating the phasor values comprises setting the synthesized intensity of at least one resolution element ($x_o'$, $y_o'$) of the intensity pattern to zero, and calculating the phasor values $e^{i\phi(x,y)}$ of the phase mask (4, 23, 43) in accordance with $$|\overline{\alpha}| = \frac{1}{2\left|\sin\frac{\theta}{2}\right|}$$

$$I(x', y') = 2\left[1 \mp \sin\left(\phi_{\overline{\alpha}} - \phi(x', y') + \frac{\theta}{2}\right)\right]$$

for selected phase shift values θ, $\phi_{\overline{\alpha}}$ being the phase of $\overline{\alpha}$.

3. A method according to claim 2, further comprising the step of selecting the phase shift θ=π, selecting $|\overline{\alpha}|$=½, and calculating the phasor values $e^{i\phi(x,y)}$ of the phase mask (4, 23, 43) in accordance with $$I(x', y') = 2[1 - \cos(\phi(x', y'))]$$

$$\iint_{\Delta x \Delta y} \sin(\phi(x, y)) dx dy = 0.$$

4. A method according to claim 1, further comprising the steps of moving the DC-part of the electromagnetic radiation to a second part of the Fourier or Fresnel plane, and phase shifting the Fourier or Fresnel transformed modulated electromagnetic radiation at the second part of the Fourier or Fresnel plane by θ in relation to the remaining part of the electromagnetic radiation.

5. A method according to claim 4, wherein the step of moving the DC-part of the electromagnetic radiation comprises utilization of an optical component, such as a grating, a prism, etc, with an appropriate carrier frequency.

6. A method according to claim 4, wherein the step of moving the DC-part of the electromagnetic radiation comprises encoding the function of an optical component, such as a grating, a prism, etc, with an appropriate carrier frequency, into the spatial phase mask (4, 23, 43).

7. A method according to claim 1, further comprising the step of adjusting the modulus of the Fourier transform of the phasors $e^{i\phi(x,y)}$ at specific spatial frequencies in order to control the range of intensity levels of the synthesized intensity pattern.

8. A method according to claim 7, wherein the step of adjusting the modulus of the Fourier transform of the phasors $e^{i\phi(x,y)}$ at specific spatial frequencies comprises at least one of the following measures:

a) adjusting the individual phasors $e^{i\phi(x,y)}$ of the resolution elements of the phase mask (4, 23, 43) maintaining prescribed relative intensity levels between intensities of resolution elements of the intensity pattern, b) adjusting the individual phasors $e^{i\phi(x,y)}$ of the resolution elements of the phase mask (4, 23, 43) by histogram techniques, c) spatially scaling the phasor $e^{i\phi(x,y)}$ pattern of the phase mask (4, 23, 43), and d) utilizing half tone coding techniques.

9. A method according to claim 1, further comprising the step of controlling power of the electromagnetic radiation in response to the intensity range of the intensity pattern.

10. A method according to claim 1, wherein each phasor $e^{i\phi(x,y)}$ of the phase mask (4, 23, 43) is selected from a set of two determined phasors with complementary phasor values $e^{i\phi 1(x,y)}$ and $e^{i\phi 2(x,y)}$ in such a way that a specific spatial frequency distribution of the intensity of the electromagnetic radiation in the Fourier or Fresnel plane is attained.

11. A method according to claim 10, wherein the phase φ(x,y) of phasors $e^{i\phi(x,y)}$ of adjacent resolution elements alternates between the two possible complementary phasor values $e^{i\phi 1(x,y)}$ and $e^{i\phi 2(x,y)}$.

12. A method according to claim 10, wherein the phasors $e^{i\phi 1(x,y)}$ and $e^{i\phi 2(x,y)}$ are complex conjugated.

13. A method according to claim 1, further comprising the step of phase shifting at selected spatial frequencies constituting a region that is shaped to match the spatial frequency content of the phasors $e^{i\phi(x,y)}$ of the spatial phase mask (4, 23, 43).

14. A method according to claim 1, wherein modulus of the average value $|\overline{\alpha}|$ of the phasors $e^{i\phi(x,y)}$ ranges from 0.1 to 0.9.

15. A method according to claim 14, wherein modulus of the average value $|\overline{\alpha}|$ of the phasors $e^{i\phi(x,y)}$ ranges from 0.25 to 0.75.

16. A method according to claim 14, wherein modulus of the average value $|\overline{\alpha}|$ of the phasors $e^{i\phi(x,y)}$ ranges from 0.4 to 0.6.

17. A method according to claim 14, wherein modulus of the average value $|\overline{\alpha}|$ of the phasors $e^{i\phi(x,y)}$ is approximately 0.5.

18. A method according to claim 1 wherein the phase shift θ ranges from π/4 to 7π/4.

19. A method according to claim 1, wherein the phase shift θ ranges from π/2 to 3π/2.

20. A method according to claim 1, wherein the phase shift θ ranges from 3π/4 to 5π/4.

21. A method according to claim 1, wherein the phase shift θ is approximately π.

22. A method according to claim 1, further comprising the step of zooming the image for scaling of the intensity pattern.

23. A method according to claim 22, wherein zooming of the image is dynamically controllable.

24. A method according to claim 22, wherein zooming of the image is controllable in dependence of the scaling of the phase mask (4, 23, 43).

25. A method according to claim 22, further comprising the step of controlling power of the electromagnetic radiation in response to the spatial scaling of the pattern in the phase mask (4, 23, 43) and/or the zooming of the image.

26. A method according to claim 1, wherein the step of phase shifting comprises utilization of a spatial light modulator.

27. A method according to claim 1, further comprising the step of encoding the optical function of a Fourier-transforming lens into the phasors $e^{i\phi(x,y)}$ of the phase mask (4, 23, 43).

28. A method according to claim 1, further comprising the step of encoding the optical function of an output lens into the phase filter (6, 27, 45).

29. A method according to claim 1, wherein the step of radiating electromagnetic radiation comprises radiation of electromagnetic radiation of different wavelengths corresponding to three different colours, such as red, green and blue, for generation of intensity patterns of arbitrary colours.

30. A phase contrast imaging system (1) for synthesizing an intensity pattern I(x',y') of an image, comprising
a source (2, 21, 41) of electromagnetic radiation for emission of electromagnetic radiation,
a spatial phase mask (4, 23, 43) for phase modulation of electromagnetic radiation and having
a plurality of individual resolution elements (x,y), each resolution element (x,y) modulating the phase of electromagnetic radiation incident upon it with a predetermined phasor value $e^{i\phi(x,y)}$, and being positioned on a propagation axis of the electromagnetic radiation,
means (5, 26, 44) for Fourier or Fresnel transforming the phase modulated electromagnetic radiation positioned on a propagation axis of the phase modulated radiation,
a spatial phase filter (6, 27, 45) for phase shifting in a region of spatial frequencies comprising DC in the Fourier or Fresnel plane, the transformed electromagnetic radiation by a predetermined phase shift value θ in relation to the remaining part of the transformed electromagnetic radiation,
means (7, 10, 26, 30, 44, 47) for forming the intensity pattern by Fourier or Fresnel transforming, respectively, the phase shifted Fourier or Fresnel transformed modulated electromagnetic radiation, whereby each resolution element (x,y) of the phase mask (4, 23, 43) is imaged on a corresponding resolution element (x',y') of the image,
the phasor values $e^{i\phi(x,y)}$ of the phase mask (4, 23, 43) and the phase shift value θ substantially fulfilling that $$I(x',y')=|e^{i\phi(x,y)}+\bar{\alpha}(e^{i\theta}-1)|^2$$

for selected phase shift values θ, $\bar{\alpha}$ being the average of the phasors $e^{i\phi(x,y)}$ of the resolution elements of the phase mask (4, 23, 43),
subject to the proviso that
if θ=π, the phase mask (4, 23, 43) is not divided into a matrix of rows and columns of resolution elements of the same size and shape, every fourth resolution element having the phasor value $e^{i\pi}$ and being distributed periodically and regularly across the area of the phase mask in such a way that every second row and every second column do not contain a resolution element with the phasor value $e^{i\pi}$, the remaining resolution elements having the phasor value $e^{i0}$, or,
if θ=π/2, the phase mask (4, 23, 43) is not divided into a matrix of rows or columns of the same size and shape, every second row or column having the phasor value $e^{i\pi/2}$ and being interlaced with the remaining rows or columns having the phasor value $e^{i0}$.

31. A system (1) according to claim 30, further comprising
means for pixellation of the intensity pattern I(x',y') in accordance with the elements (x,y) of the spatial phase mask (4, 23, 43),
means for calculating the phasor values $e^{i\phi(x,y)}$ of the phase mask (4, 23, 43) and the phase shift value θ in accordance with equation $$I(x',y')=|e^{i\phi(x,y)}+\bar{\alpha}(e^{i\theta}-1)|^2,$$

means for selecting, for each resolution element, one of two phasor values which represent a particular grey level, and
means for supplying the calculated phasor values $e^{i\phi(x,y)}$ to the elements (x,y) of the phase mask (4, 23, 43).

32. A system (1) according to claim 30, wherein the intensity is zero for at least one resolution element $(x_o',y_o')$ of the intensity pattern, and wherein the phasor values $e^{i\phi(x,y)}$ of the phase mask (4, 23, 43) substantially fulfil that $$|\bar{\alpha}| = \frac{1}{2\left|\sin\frac{\theta}{2}\right|}$$

$$I(x',y') = 2\left[1 \mp \sin\left(\phi_{\bar{\alpha}} - \phi(x',y') + \frac{\theta}{2}\right)\right]$$

for selected phase shift values θ, $\phi_{\bar{\alpha}}$ being the phase of $\bar{\alpha}$.

33. A system (1) according to claim 31, wherein the means for calculating the phasor values is adapted to calculate the phasor values $e^{i\phi(x,y)}$ of the phase mask (4, 23, 43) in accordance with $$|\bar{\alpha}| = \frac{1}{2\left|\sin\frac{\theta}{2}\right|}$$

$$I(x',y') = 2\left[1 \mp \sin\left(\phi_{\bar{\alpha}} - \phi(x',y') + \frac{\theta}{2}\right)\right]$$

for selected phase shift values θ, $\phi_{\bar{\alpha}}$ being the phase of $\bar{\alpha}$.

34. A system (1) according to claim 32, wherein the phase shift θ is substantially equal to π and $\bar{\alpha}$ is substantially equal to ½, and the phases φ(x,y) substantially fulfil that $$I(x',y') = 2[1 - \cos(\phi(x',y'))]$$

$$\iint_{\Delta x \Delta y} \sin(\phi(x,y)) dx dy = 0.$$

35. A system (1) according to claim 33, wherein the means for calculating the phasor values is adapted to calculate the phasor values $e^{i\phi(x,y)}$ of the phase mask (4, 23, 43) in accordance with $$I(x',y') = 2[1 - \cos(\phi(x',y'))]$$

$$\iint_{\Delta x \Delta y} \sin(\phi(x,y)) dx dy = 0.$$

36. A system (1) according to claim 30, further comprising
means for moving the region of spatial frequencies comprising DC to a second part of the Fourier or Fresnel plane, and wherein
the phase filter (6, 27, 45) is positioned at the second part of the Fourier or Fresnel plane for phase shifting of the transformed modulated electromagnetic radiation at the second part of the Fourier or Fresnel plane by θ in relation to the remaining part of the electromagnetic radiation.

37. A system (1) according to claim 36, wherein the means for moving the region of spatial frequencies comprising DC to a second part of the Fourier or Fresnel plane comprises an optical component, such as a grating, a prism, etc, with an appropriate carrier frequency.

38. A system (1) according to claim 36, wherein the means for moving the region of spatial frequencies comprising DC to a second part of the Fourier or Fresnel plane comprises the phase mask (4, 23, 43) in which the function of an optical component, such as a grating, a prism, etc, with an appropriate carrier frequency, has been encoded.

39. A system (1) according to claim 30, wherein the modulus of the Fourier transform of the phasors $e^{i\phi(x,y)}$ at specific spatial frequencies have been adjusted to keep the intensity levels of the synthesized intensity pattern within a desired range.

40. A system (1) according to claim 39, wherein the modulus of the Fourier transform of the phasors $e^{i\phi(x,y)}$ at specific spatial frequencies have been adjusted according to at least one of the following measures:
   a) adjusting the individual phasors $e^{i\phi(x,y)}$ of the resolution elements of the phase mask (4, 23, 43) maintaining prescribed relative intensity levels between intensities of resolution elements of the intensity pattern,
   b) adjusting the individual phasors $e^{i\phi(x,y)}$ of the resolution elements of the phase mask (4, 23, 43) by histogram techniques,
   c) spatially scaling the phasor $e^{i\phi(x,y)}$ pattern of the phase mask (4, 23, 43), and
   d) utilizing half tone coding techniques.

41. A system (1) according to claim 30, further comprising means for controlling power of the electromagnetic radiation in response to the intensity range of the intensity pattern.

42. A system (1) according to claim 30, wherein each phasor $e^{i\phi(x,y)}$ of the phase mask (4, 23, 43) is substantially equal to a selected phasor that has been selected from a set of two phasors with complementary phase values $e^{i\phi1(x,y)}$ and $e^{i\phi2(x,y)}$ in such a way that a specific spatial frequency distribution of the intensity of the electromagnetic radiation in the Fourier or Fresnel plane is attained.

43. A system (1) according to claim 42, wherein the phase $\phi(x,y)$ of phasors $e^{i\phi(x,y)}$ of adjacent resolution elements alternates between the two possible complementary phasor values $e^{i\phi1(x,y)}$ and $e^{i\phi2(x,y)}$.

44. A system (1) according to claim 30, wherein the phase filter (6, 27, 45) is shaped to match the spatial frequency content of the phasors $e^{i\phi(x,y)}$ of the spatial phase mask (4, 23, 43).

45. A system (1) according to claim 30, wherein modulus of the average value $|\overline{\alpha}|$ of the phasors $e^{i\phi(x,y)}$ ranges from 0.1 to 0.9.

46. A system (1) according to claim 45, wherein modulus of the average value $|\overline{\alpha}|$ of the phasors $e^{i\phi(x,y)}$ ranges from 0.25 to 0.75.

47. A system (1) according to claim 45, wherein modulus of the average value $|\overline{\alpha}|$ of the phasors $e^{i\phi(x,y)}$ ranges from 0.4 to 0.6.

48. A system (1) according to claim 45, wherein modulus of the average value $|\overline{\alpha}|$ of the phasors $e^{i\phi(x,y)}$ is approximately 0.5.

49. A system (1) according to claim 45, wherein the phase shift $\theta$ ranges from $\pi/4$ to $7\pi/4$.

50. A system (1) according to claim 45, wherein the phase shift $\theta$ ranges from $\pi/2$ to $3\pi/2$.

51. A system (1) according to claim 45, wherein the phase shift $\theta$ ranges from $3\pi/4$ to $5\pi/4$.

52. A system (1) according to claim 30, wherein the phase shift $\theta$ is approximately $\pi$.

53. A system (1) according to claim 30, further comprising zooming means (10, 30, 47) for scaling of the intensity pattern.

54. A system (1) according Lo claim 30, wherein the phase filter (6, 27, 45) comprises a spatial light modulator.

55. A system (1) according to claim 30, wherein the phase mask (4, 23, 43) is adapted to perform the optical function of a Fourier-transforming lens by appropriate encoding of the phasors $e^{i\phi(x,y)}$ of the phase mask (4, 23, 43).

56. A system (1) according to claim 30, wherein the spatial phase filter (6, 27, 45) is adapted to perform the optical function of an output lens by appropriate encoding of the phase filter (6, 27, 45).

57. A system (1) according to claim 30, wherein the source (2, 21, 41) of electromagnetic radiation is adapted to radiate electromagnetic radiation of different wavelengths corresponding to three different colours, such as red, green and blue, for generation of intensity patterns of arbitrary colours.

58. A system (1) according to claim 30, further comprising a first and a second Fourier transforming lens (5, 7), the spatial phase mask (4, 23, 43) being positioned in the front focal plane of the first lens (5), the spatial phase filter (6, 27, 45) being positioned at the back focal plane of the first lens (5), and the second lens (7) being positioned so that its front focal plane is positioned at the position of the back focal plane of the first lens (5).

59. A system (1) according to claim 30, further comprising one Fourier transforming lens (44), the spatial phase filter (45) being positioned at the back focal plane of the lens (44).

60. A system (1) according to claim 30, further comprising one imaging lens, the spatial phase filter (6, 27, 45) being positioned in the back focal plane of the lens.

61. A system (1) according to claim 30, further comprising a polarizing beam splitter (24) and a quarter wave plate (25) and/or a phase filter (27) reflecting electromagnetic radiation incident upon it.

62. A system (1) according to claim 30, wherein the spatial phase filter (6, 27, 45) changes the phase of the radiation in the region of spatial frequencies comprising DC and leaves the phase of the remaining part of the radiation unchanged.

63. A system (1) according to claim 30, wherein the spatial phase filter (6, 27, 45) do not change the phase of the radiation in the region of spatial frequencies comprising DC and changes the phase of the remaining part of the radiation.

64. A system (1) according to claim 30, wherein the spatial phase filter (6, 27, 45) blocks the radiation at the region of spatial frequencies comprising DC and leaves the remaining part of the radiation unchanged.

65. A system (1) according to claim 30, wherein the source (2, 21, 41) of electromagnetic radiation is a Laser (2, 21, 41).

* * * * *

UNITED STATES PATENT AND TRADEMARK OFFICE
CERTIFICATE OF CORRECTION

PATENT NO. : 6,011,874
DATED : January 4, 2000
INVENTOR(S) : Gluckstad

It is certified that error appears in the above-identified patent and that said Letters Patent is hereby corrected as shown below:

(Column 2, line 37), change "$|\exp[j(\pi/2)+j\emptyset|^2$" to --$|\exp[j(\pi/2)+j\emptyset]|^2$--.

(Column 2, line 40), change "$|\exp[j(3\pi/2)+j\emptyset|^2$" to --$|\exp[j(3\pi/2)+j\emptyset]|^2$--.

(Column 3, line 5) change "Zernike" to --Zernik--.

(Column 6, line 59) change "$e^{i\overline{\alpha}(x,y)}-\overline{\alpha}$" to --$e^{i\phi(x,y)}-\overline{\alpha}$--.

(Column 9, line 54) change "if" to --1f--.

(Column 10, line 59) change "if" to --1f--.

(Column 11, line 60) change "where $f_x = \sqrt{f_x^2 + f_y^2}$" to --where $f_r = \sqrt{f_x^2 + f_y^2}$--.

(Column 13, line 39) change "$|o(x',y')|^{12} = 2[1-\cos(\emptyset(x',y'))]$" to --$|o(x',y')|^2 = 2[1-\cos(\emptyset(x',y'))]$--.

(Column 13, line 41) change "phaseointensity" to --phase→intensity--.

(Column 15, line 37) delete "7".

(Column 15, line 41) change "$|o(i)_{adj}|^2$" to --$|o(i)|^2_{adj}$--.

Page 1 of 2

UNITED STATES PATENT AND TRADEMARK OFFICE
CERTIFICATE OF CORRECTION

PATENT NO. : 6,011,874
DATED : January 4, 2000
INVENTOR(S) : Glückstad

Page 2 of 2

It is certified that error appears in the above-identified patent and that said Letters Patent is hereby corrected as shown below:

(Column 21, line 37) change "$I(x',y')= |e^{i\phi(x,y)}+\alpha(e^{i\theta}-1)|^2$" to --$I(x',y')= |e^{i\phi(x',y')}+\alpha(e^{i\theta}-1)|^2$--.

(Column 24, line 9) change "according Lo" to --according to--.

Signed and Sealed this

Twenty-fourth Day of April, 2001

Attest:

NICHOLAS P. GODICI

Attesting Officer

Acting Director of the United States Patent and Trademark Office